(12) United States Patent
Costa et al.

(10) Patent No.: US 8,352,406 B2
(45) Date of Patent: Jan. 8, 2013

(54) METHODS AND SYSTEMS FOR PREDICTING JOB SEEKING BEHAVIOR

(75) Inventors: Philip Costa, Cambridge, MA (US); Leah Nicole Daniels, Framingham, MA (US); Philip Chase Siebert, Boston, MA (US); Matthew Thomas Moore, Somerville, MA (US)

(73) Assignee: Bullhorn, Inc., Boston, MA (US)

( * ) Notice: Subject to any disclaimer, the term of this patent is extended or adjusted under 35 U.S.C. 154(b) by 0 days.

(21) Appl. No.: 13/289,168

(22) Filed: Nov. 4, 2011

(65) Prior Publication Data

US 2012/0197835 A1  Aug. 2, 2012

Related U.S. Application Data

(60) Provisional application No. 61/438,333, filed on Feb. 1, 2011.

(51) Int. Cl.
*G06F 17/00* (2006.01)
*G06N 5/02* (2006.01)

(52) U.S. Cl. ........................................ 706/50
(58) Field of Classification Search .................. 706/52, 706/50
See application file for complete search history.

(56) References Cited

U.S. PATENT DOCUMENTS

| 6,385,620 | B1 | 5/2002 | Kurzius et al. |
| 7,367,808 | B1 | 5/2008 | Frank et al. |
| 7,472,097 | B1 | 12/2008 | Scarborough et al. |
| 7,886,000 | B1 | 2/2011 | Polis et al. |
| 7,991,641 | B2 | 8/2011 | Vegliante et al. |
| 7,996,912 | B2 | 8/2011 | Spalink et al. |
| 2003/0120537 | A1 | 6/2003 | Desanti et al. |
| 2003/0177027 | A1 | 9/2003 | Dimarco |
| 2003/0191680 | A1 | 10/2003 | Dewar |
| 2003/0193958 | A1 | 10/2003 | Narayanan |
| 2003/0200142 | A1 | 10/2003 | Hicks et al. |
| 2003/0208752 | A1 | 11/2003 | Farris |
| 2004/0060051 | A1 | 3/2004 | Bradshaw |
| 2006/0070117 | A1 | 3/2006 | Spalink et al. |
| 2006/0178896 | A1 | 8/2006 | Sproul |
| 2006/0265270 | A1* | 11/2006 | Hyder et al. ............... 705/9 |
| 2006/0282306 | A1 | 12/2006 | Thissen-roe |
| 2007/0033064 | A1 | 2/2007 | Abrahamsohn |
| 2008/0015978 | A1 | 1/2008 | Curry et al. |
| 2008/0097781 | A1* | 4/2008 | Clarke et al. .............. 705/1 |
| 2008/0227063 | A1 | 9/2008 | Kenedy et al. |
| 2009/0150166 | A1 | 6/2009 | Leite et al. |

(Continued)

OTHER PUBLICATIONS

Chien, Chen-Fu and Li-Fei Chen. "Data Mining to improve personnel selection and enhance human capital: A case study in high-technology Industry" Expert system with Applications 34 (2008) [Online] Downloaded Jul. 30, 2012 http://www.sciencedirect.com/science/article/pii/S0957417406002776.*

(Continued)

*Primary Examiner* — Ben Rifkin
(74) *Attorney, Agent, or Firm* — Bingham McCutchen, LLP

(57) ABSTRACT

Embodiments of the present invention analyze information available from social-media websites to predict the likelihood that a prospective candidate will become an active recruitement candidate.

12 Claims, 6 Drawing Sheets

U.S. PATENT DOCUMENTS

| | | |
|---|---|---|
| 2009/0248599 A1 | 10/2009 | Hueter et al. |
| 2009/0248614 A1 | 10/2009 | Bhagwan et al. |
| 2009/0254510 A1* | 10/2009 | Omoigui .................. 706/55 |
| 2009/0287713 A1 | 11/2009 | Anderson et al. |
| 2009/0292590 A1 | 11/2009 | Zaidi |
| 2010/0169136 A1 | 7/2010 | Kho et al. |
| 2010/0274912 A1 | 10/2010 | Barnfield et al. |
| 2011/0022530 A1 | 1/2011 | Bogle et al. |
| 2011/0077989 A1 | 3/2011 | Akred et al. |
| 2011/0099118 A1 | 4/2011 | Rudloff |
| 2011/0131082 A1 | 6/2011 | Manser et al. |
| 2011/0161444 A1 | 6/2011 | Chauhan |
| 2011/0161791 A1 | 6/2011 | Travis et al. |
| 2011/0173035 A1 | 7/2011 | Isom |
| 2011/0196802 A1 | 8/2011 | Ellis et al. |

OTHER PUBLICATIONS

Laumer, Sven and Andreas Eckhardt "Help to Find the Needle in a Haystack—Integrating Recommender Systems in an IT Supported Staff Recruitment System" SIGMIS-CPR May 2009. [Online] Downloaded Jul. 30, 2012 http://delivery.acm.org/10.1145/1550000/1542133/p7-laumer.pdf?ip=151.207.242.4&acc=ACTIVE%20SERVICE&CFID=99650501&CFTOKEN=87033138&_acm_=13436982.*

* cited by examiner

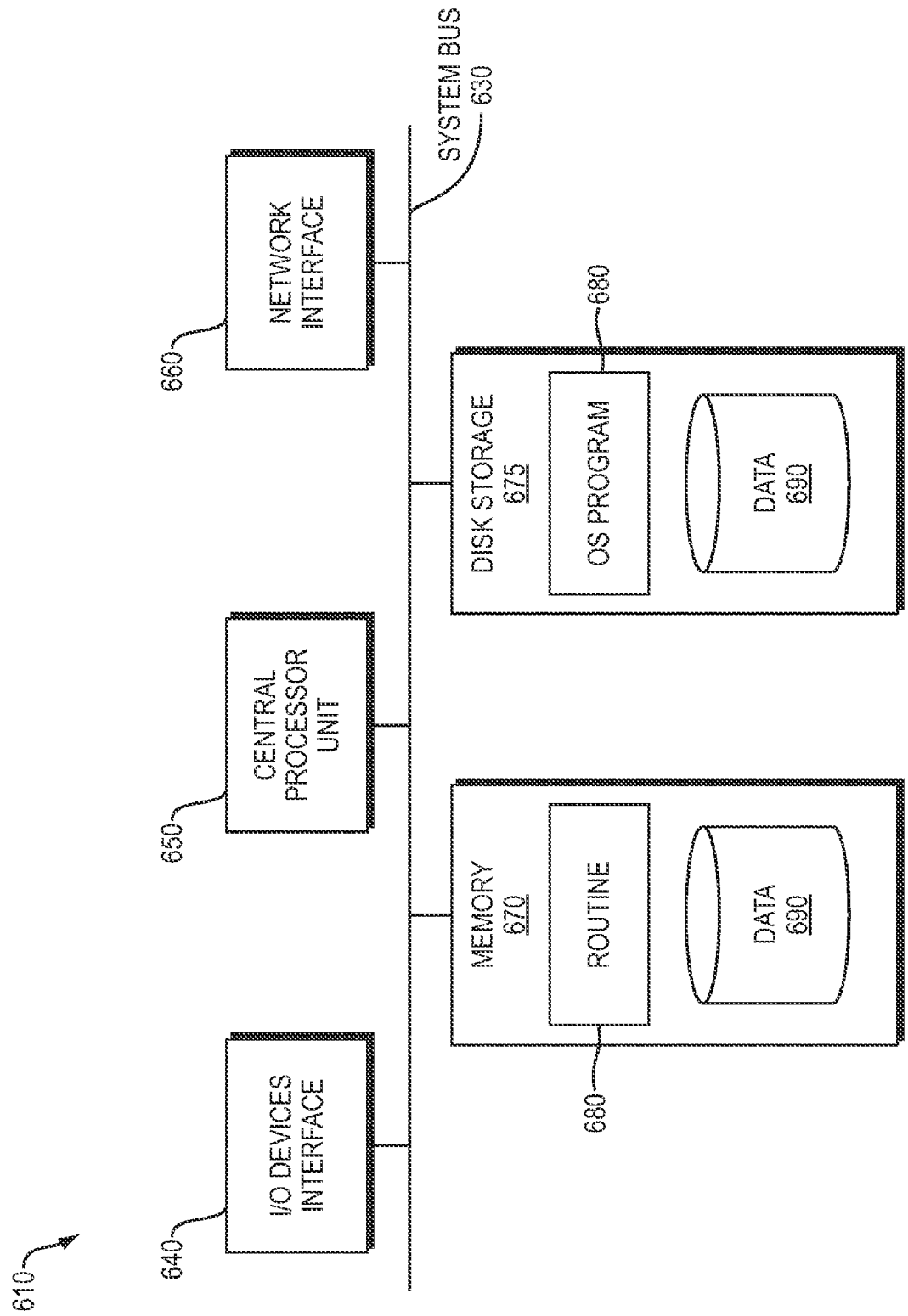

METHODS AND SYSTEMS FOR PREDICTING JOB SEEKING BEHAVIOR

RELATED APPLICATION

This application claims priority to, and the benefits of, U.S. Provisional Application Ser. No. 61/438,333, filed on Feb. 1, 2011, the entire disclosure of which is hereby incorporated by reference.

BACKGROUND OF THE INVENTION

Human resources and recruiting communities continually seek a competitive edge and more actionable information. From a recruiting perspective, "passive candidates" are individuals who are top performers, currently employed, and not actively (or explicitly) seeking a new role; they are also considered the most valuable and the hardest to recruit. Finding a passive candidate immediately before she becomes an "active candidate"—i.e., a candidate who is actively and explicitly pursuing job opportunities —represents the best of both worlds: the individual is as amenable to new opportunities as a passive candidate, but is not as difficult to recruit. Further, for employers, the ability to identify individuals who are about to become active candidates on the open job market provides an opportunity to intervene in order to retain top performers. (In a recruiting context, candidates may also be referred to as "contacts.")

Unfortunately, the ability to identify promising candidates (particularly those about to transition into active job-seeking) is very limited both for recruiters and employers. Employees' individual dissatisfactions reach the ears of management only sporadically and unpredictably, and those who broadcast their unhappiness are rarely the ones a company would strive to retain. Recruiters must generally rely on coarse indicators such as a candidate's level of responsibility and longevity with his current employer—indicators that correlate weakly with the candidate's likely interest level in new opportunities.

SUMMARY OF THE INVENTION

Embodiments of the present invention analyze information available from social-media websites to predict the likelihood that a prospective candidate will become an active recruitement candidate. The terms "social media" and "social networks" herein refer to technology tools designed for a party to disseminate, discuss, share, or acquire information to or from a group of individuals with whom the party has indicated an interest. Information may be generated by the party (often termed "user-generated content") or may be widely available; while user-generated content can vary in format (e.g., words, pictures, videos, audio), behavioral information (reflecting actions taken by the user as opposed to, for example, information posted) can also be accessed and used in accordance herewith. In some social networks, parties divulge information to "listeners" (also referred to as "followers") who have elected to follow the stream of information for that particular party. Uses for social media are as varied as the parties engaging with them, and include, for example, personal, consumer, and business-related uses. When a party listens or follows many individuals or other parties, the information (also referred to as "updates" or "events") may flow to the party in real-time as a stream of information. The number of updates or amount of information can vary with the number of parties being "listened" to or followed and the frequency and amount or volume of information that each party produces. Social-media websites includes FACEBOOK, LinkedIn, GOOGLE+, TWITTER, MYSPACE and many others.

The challenge for human resource or recruiting professionals today in managing social media information is at least five-fold: (1) the sheer volume of information is nearly impossible to manage manually, (2) the actions that would indicate future job seeking behavior often happen over time, (3) the appearance of any given action taken in isolation does not necessarily indicate that a person will become a job seeker—that is, a combination of multiple actions over a period of time can also indicate that a person is imminently about to become a job seeker, (4) actions that contradict job-seeking behavior (e.g., a recent promotion) must be considered as well, and (5) diverse information related to an individual's future job-seeking behavior may be available through different social networks, which makes it extremely challenging to coalesce the information in order to draw conclusions or inferences.

Accordingly, the approach described herein allows information about a prospective candidate to be aggregated from one or more social-media websites with which the candidate interacts and a prediction made, based on this information, whether the prospective candidate is or is likely to become an active recruitement candidate—e.g., whether a passive (or implicit) candidate will become an active (or explicit) candidate. In various embodiments, relevant information or events are gleaned from social-media websites and may include, for example, specific words, actions, connections, or updates provided or undertaken by a party.

Relevant information obtained in accordance herewith may be analyzed over a period of time to detect patterns indicative of future behavior and, based on those patterns, to determine whether a passive candidate is likely to become an active candidate. The determination may be reported to, for example, a user and may include a recommendation of an action for the user to take with respect to the candidate. In some embodiments, information may be aggregated from information feeds of multiple different social media websites, and in some embodiments information that is not relevant to whether the passive candidate may become an active candidate may be eliminated. One exemplary way of determining whether the passive candidate is likely to become an active candidate involves determining, for the passive candidate, a score indicating a likelihood that the passive candidate will become an active candidate. The score may be determined by assigning weight values to instances of information matching patterns that indicate future behavior of the passive candidate. When added together, if the total of the assigned weight values of the patterns exceeds a given threshold value, then it may be predicted that the passive candidate will become an active candidate.

Accordingly, in a first aspect, the invention pertains to a computer-implemented method for identifying active candidates for recruitment. In various embodiments, the method comprises obtaining, from at least one social media website, information regarding a prospective candidate; and computationally predicting, based on the obtained information, whether the prospective candidate is or is likely to become an active recruitment candidate. The information may, in some embodiments, be obtained repeatedly over a predetermined time period and analyzed for a pattern indicative of whether the prospective candidate is or is likely to become an active recruitment candidate; the prediction may be based at least in part on the analysis. Relevant information may include, for example, updates to the prospective candidate's end user profile, recommendations, connections to recruiters, and/or text phrases indicative of recruitment potential.

The information may be treated as signals and weights associated with the signals, and the pattern may comprise a minimum number of signals within the predetermined time period and/or a minimum aggregate signal weight within the predetermined time period. Alternatively or in addition, the pattern may comprise updates to the prospective candidate's end user profile during the predetermined time period, recommendations posted during the predetermined time period, connections to recruiters established during the predetermined time period, and/or text phrases indicative of recruitment potential introduced during the predetermined time period. The information may also comprise false-positive indicators, for example, an indication that the prospective candidate has begun new employment within the past three months.

Computational prediction may involve computing, from the information, a quantitative score indicative of the likelihood that the prospective candidate is or will become an active recruitment candidate. Moreover, the method may comprise computationally initiating an action based on a prediction that the prospective candidate is or is likely to become an active recruitment candidate. The action may be or comprise, for example, alerting a user to the positive prediction, adding identifying information for the prospective candidate into an active candidate database, sending a message to the prospective candidate, and/or telephoning the prospective candidate.

In another aspect, the invention relates to a system for identifying active candidates for recruitment. In various embodiments, the system includes a database for storing information regarding prospective candidates, and a processor for executing (i) an information module for obtaining, from at least one social media website, information regarding a prospective candidate and storing the information in the database; and (ii) a prediction module for scanning the database and predicting, based on the obtained information, whether the prospective candidate is or is likely to become an active recruitment candidate. In various embodiments, the information module is configured to repeatedly obtain information, over a predetermined time period, from the at least one social media website, and the prediction module is configured to analyze the obtained information for a pattern indicative of whether the prospective candidate is or is likely to become an active recruitment candidate.

The information obtained by the information module may comprise updates to the prospective candidate's end user profile, recommendations, connections to recruiters, and/or text phrases indicative of recruitment potential. The information may be treated as signals and weights associated with the signals, and the pattern may comprise a minimum number of signals within the predetermined time period and/or a minimum aggregate signal weight within the predetermined time period. Alternatively or in addition, the pattern may comprise updates to the prospective candidate's end user profile during the predetermined time period, recommendations posted during the predetermined time period, connections to recruiters established during the predetermined time period, and/or text phrases indicative of recruitment potential introduced during the predetermined time period. The information may also comprise false-positive indicators, for example, an indication that the prospective candidate has begun new employment within the past three months.

In some embodiments the prediction module computes, from the information, a quantitative score indicative of the likelihood that the prospective candidate is or will become an active recruitment candidate. An action module may, for example, generate reports of predictions made by the prediction module.

DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a block diagram of a computer that may be used to implement the techniques described herein.

DETAILED DESCRIPTION

To predict the behavior of individuals using social media information, embodiments of the present invention aggregate feeds of information from one or more social-media sites, leveraging authorized access to end users' social-networking accounts. This may be accomplished using "O-Auth," an open protocol that enables users to share resources among different websites. The information may be continuously obtained, or may be obtained periodically, e.g., nightly.

After aggregating the information by downloading streams of information available through end-user accounts, relevant information or events available in the social-media streams may be identified. As described in greater detail below, relevant information may include, for example, specific words, actions, connections, or updates provided or undertaken by a party and visible on a social-media website, e.g., via updates to the party's end-user profile, recommendations, connections to recruiters, and certain phrases used in postings or other visible activity. The relevant information may then be aggregated and analyzed over a period of time for patterns that indicate future behavior. This may be accomplished by assigning a numeric relevance strength to each event or piece of information and computing a score based on the weighted numeric aggregate, either as a snapshot or, more typically, over time. By processing information over a number of social networks and over time, more information can be considered, resulting in a better prediction of whether a passive (implicit) candidate will become an active (explicit) candidate.

This prediction can help a recruiter preemptively identify individuals that are about to become active job seekers, giving the recruiter an advantage over other recruiters. Alternatively or in addition, the prediction may help a human-resources professional prevent the loss of a valued employee by recognizing that she is about to become active an job seeker and intervening by, for example, offering the employee additional compensation or benefits. The methods and systems disclosed herein can also identify false positives, i.e., individuals whose raw score suggests active job-seeking but who are, in fact, unlikely to be interested in new positions.

Embodiments of the present invention also facilitate identification of individuals who have recently changed companies or positions within an organization. This information is particularly valuable to certain people in the business-to-business space, including recruiters, sales people, small business owners, and client managers. The ability of a user to identify rapid job movement within the user's social sphere can also provide a competitive advantage.

Figure 1:
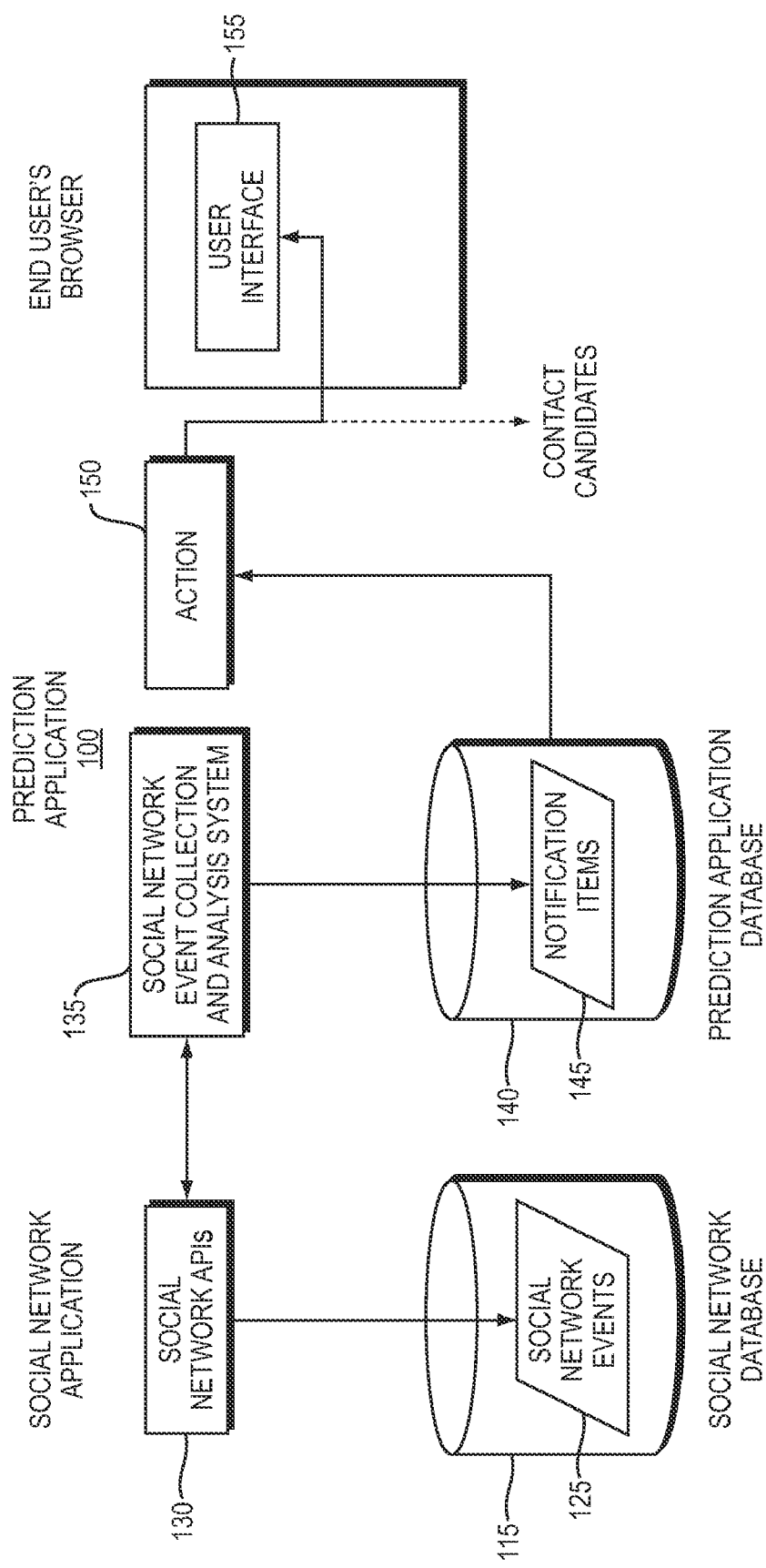
FIG. 1 is block diagram illustrating the relationship of an example prediction system with a social media network and an end user, according to an exemplary embodiment of the present invention.

FIG. 1 illustrates the integration of a prediction system 100 in accordance herewith with a social-media application (SMA), which may be hosted on a server managed by or for the proprietor of the SMA. The SMA utilizes a database 115 that stores events 125 as these occur within the system. Events include content posted by users of the SMA, changes to a user's profile, establishment of connections to other users, and other actions taken or content provided by a user that is logged in database 115 and associated with the specific user. These events 125 are accessible via a variety of public APIs 130 provided by the SMA for use by third-party applications. The databases described herein are typically implemented in non-volatile computer storage as described in greater detail below.

The system 100 may execute on one or more servers and typically includes a collection and analysis system 135 that retrieves the events 125 (or copies or indications thereof) via the APIs 130 and associates these with the relevant individuals. The retrieved events and the individuals to whom they pertain may be stored as records in a prediction database 140 for analysis, or may be analyzed in volatile memory without being stored. The analysis described below and performed by the analysis system 135 identifies individuals likely to be or become active recruitment candidates. Database records corresponding to these individuals are tagged, and notification items 145 generated and associated with the database records. These items 145 can include an action item associated with that individual (e.g., "touch base with the individual"). The analysis system 135 updates the database (including notification items) as new events pertaining to the stored records are detected; for example, the records may be re-scored and a notification item 145 canceled or added based on the new score, or in response to a false-positive signal.

An action module 150 periodically scans the database 140 for notification items 145 and takes action based thereon. One such action may be periodic generation of a report listing potential recruitment candidates and their scores, as well as any action items associated with the relevant database records. For example, the action module 150 may generate HTML pages containing the report information for display to an end user via a conventional web browser or other user interface 155; the HTML pages may be loaded to a website maintained by or for the proprietor of the prediction system and served to authorized requesters, and in some embodiments, the action module 150 contains webserver functionality. Another action item may be generation of emails, either to the end user on a scheduled basis or to alert him of a particularly important candidate-specific event; or, in some embodiments, to the candidate herself, informing her of the end user's recruitment services and possibly some specifics regarding an open position to arouse the candidate's interest. Still other actions that may be performed by the action module 150 can include placement of automated telephone calls, generation of postal mailings, etc.

Figure 2:
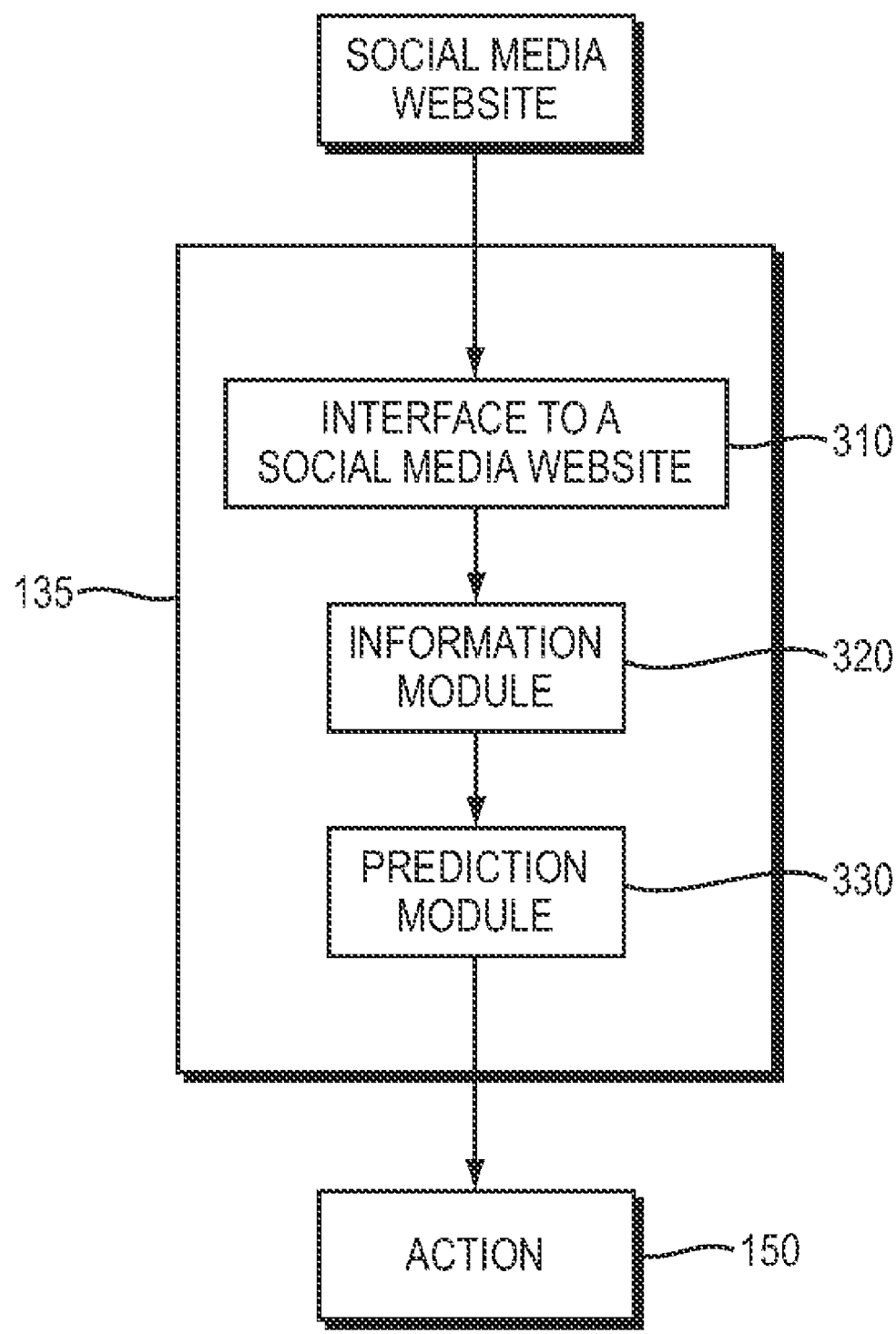
FIG. 2 is a block diagram illustrating an exemplary computer system for automatically predicting whether an individual in a social network is in the process of becoming an active job seeker.

FIG. 2 shows in greater detail the functional components of the collection and analysis system 135. It should be understood that the system 135 is conceptually illustrated as a group of functional modules, which may be realized in software and/or hardware as explained below, but no particular architecture or distribution of functionality is critical to the invention. As illustrated, the system 135 includes an interface module 310 that accesses data from SMAs via APIs as described above. The interface module 310 includes conventional scripts that target the information relevant to candidate scoring; this information is processed by an information module 320. The module 320 prunes information not relevant to the prediction from the SMA information feed and aggregates the filtered information for each candidate under consideration. It also operates the interface 310 to retrieve social-media information periodically or according to a schedule, which can vary for different candidates depending on their scores and/or the nature of the most recently retrieved information about them. The filtered information is provided to a prediction module 330, which analyzes the information as described below. (In fact, the information module 320 typically stores the filtered information in a database 140 as shown in FIG. 1, making it available for retrieval by the prediction module 330.)

Figure 3:
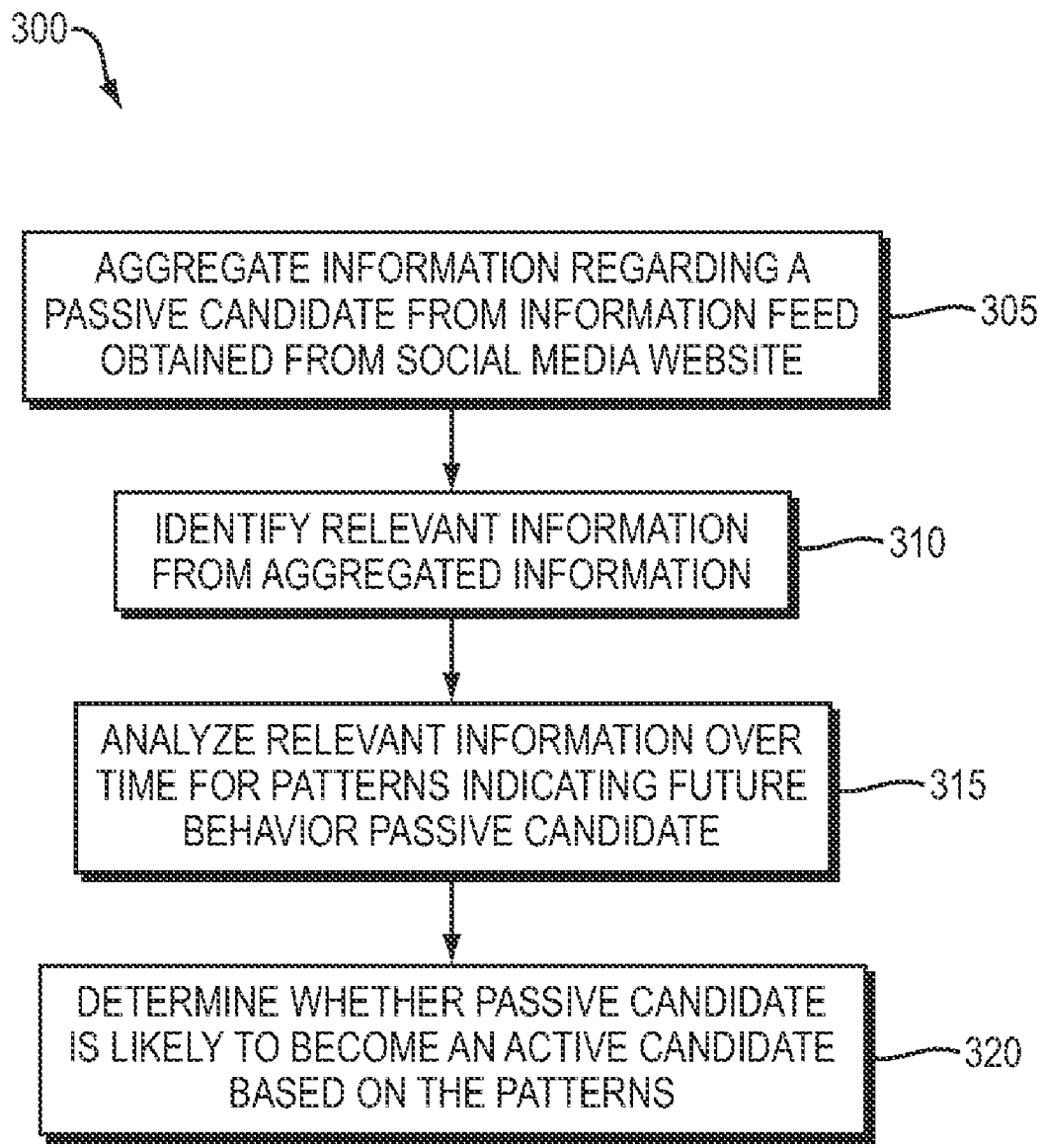
FIG. 3 is flow diagram illustrating an exemplary computer-implemented method for automatically predicting whether an individual in a social network is in the process of becoming an active job seeker.

FIG. 3 illustrates, still at a high level, a representative method 300 by which the computer-based system 100 may predict whether an individual is in the process of becoming an active job seeker. The method 300 involves aggregating (at step 305) information about a prospective candidate from at least one SMA website via an information feed from the website. From the aggregated information, information relevant to whether the passive candidate may become an active candidate is identified (step 310). This information is analyzed (step 315) over a period of time to find patterns that indicate future behavior of a prospective candidate and, based on those patterns, to determine whether the candidate is likely to become an active candidate (step 320).

Figure 4:
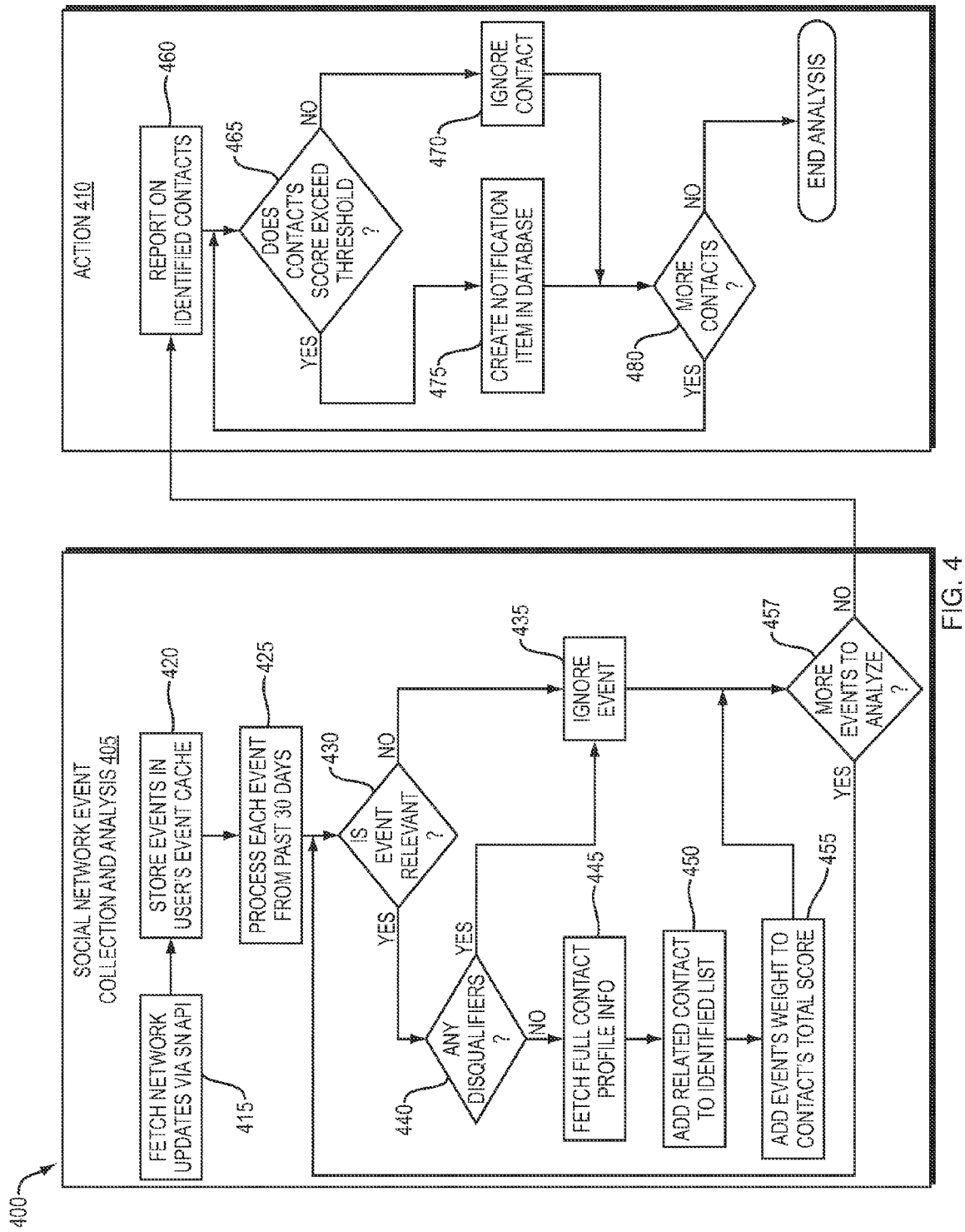
FIG. 4 is a detailed flow diagram illustrating an exemplary computer-implemented method for automatically predicting whether an individual in a social network is in the process of becoming an active job seeker.

FIG. 4 illustrates the method in greater detail. The illustrated computer-implemented process flow 400 includes two basic operations: event collection and analysis 405 and connection reporting 410. In step 415, a candidate's social network updates are obtained on a scheduled basis using the SMA's APIs. These updates typically contain messages from the SMA reporting changes that have occurred in the candidate's profile or personal page(s), including, for example, new connections between people (e.g., other social-network users), new recommendations, etc. Indications of these updates ("events") may be stored (step 420) in a temporary cache while they are analyzed.

Events spanning a specified time period (e.g., the last 30 days or the last 60 days) are analyzed (step 425) by making several determinations for each of the updates obtained about the candidate. First, the method 400 determines whether an update represents an event suggesting that the candidate has begun or may soon begin a job search (step 430). As a specific example, obtaining a recommendation is such an event. If the update being evaluated does not match any of several relevant event types, it may be ignored (step 435) and discarded. If the update/event is relevant, however, the method 400 determines whether the candidate has been disqualified (step 440). This may be based on a list of individuals (e.g., social network identifiers) that the end user wishes to ignore. If the particular individual is on the list of disqualified candidates, the event is ignored (step 435) and discarded.

If the candidate has not been disqualified, the method 400 obtains the candidate's full profile (step 445), as well as the profile of any other social-media user connected with the event. For example, if the candidate connects with an individual whose title or company name suggests that the individual is a recruiter, the event may be weighted as more relevant than if the new connection is simply a colleague or social friend of the candidate. For subsequent events involving the same connected-to contact, it may not be necessary to again retrieve the contact's profile information, at least until after a period of time (e.g., one month or three months) has elapsed in order to avoid duplicate retrievals of redundant information. The method 400 may also recognize the connected-to contact as a potential candidate and add a record for that individual in the database 140 (see FIG. 1), initiating the method 400 for the new record. The original candidate's database record (in particular, the candidate's score) is updated to reflect the occurrence of the event and its weight (step 455).

Once all of the events have been analyzed, an action process 410 is initiated (and typically executed by the action module 150, as described in connection with FIG. 1). For example, the action may be execution of a reporting process. To begin this process, notification items are generated by selecting (step 460) candidates whose score exceeds a minimum threshold value (step 465) that suggests the candidate has begun or is likely soon to begin looking for a new position. The database record of a candidate with a qualifying score may be reviewed for factors or events suggesting a false positive—e.g., an event indicating that the candidate has recently changed jobs or was promoted—in which case processing terminates for that candidate (step 470); in addition, a flag or attribute of the database record may be set to eliminate the candidate from future consideration, but typically only for a set period of time (e.g., three months, six months, or a year), following which the flag or attribute disappears and the candidate's record once again becomes active. For example, an individual who has recently acquired multiple recommendations and has updated his or her profile, but who has also taken a new role in the past three months, is most likely no longer an active job seeker but may become one again after several months.

For each candidate whose score exceeds the threshold and who was not eliminated in step 470, the candidate's database record is updated and at least one notification item created therein (step 480). Notification items can include the relevant events, basic profile information for the individual, and an action item associated with that individual (e.g., "touch base with the individual"). The process continues (step 480) for all individuals indentified by the process 410. A report is then generated and presented to the end user as described above.

Figure 5:
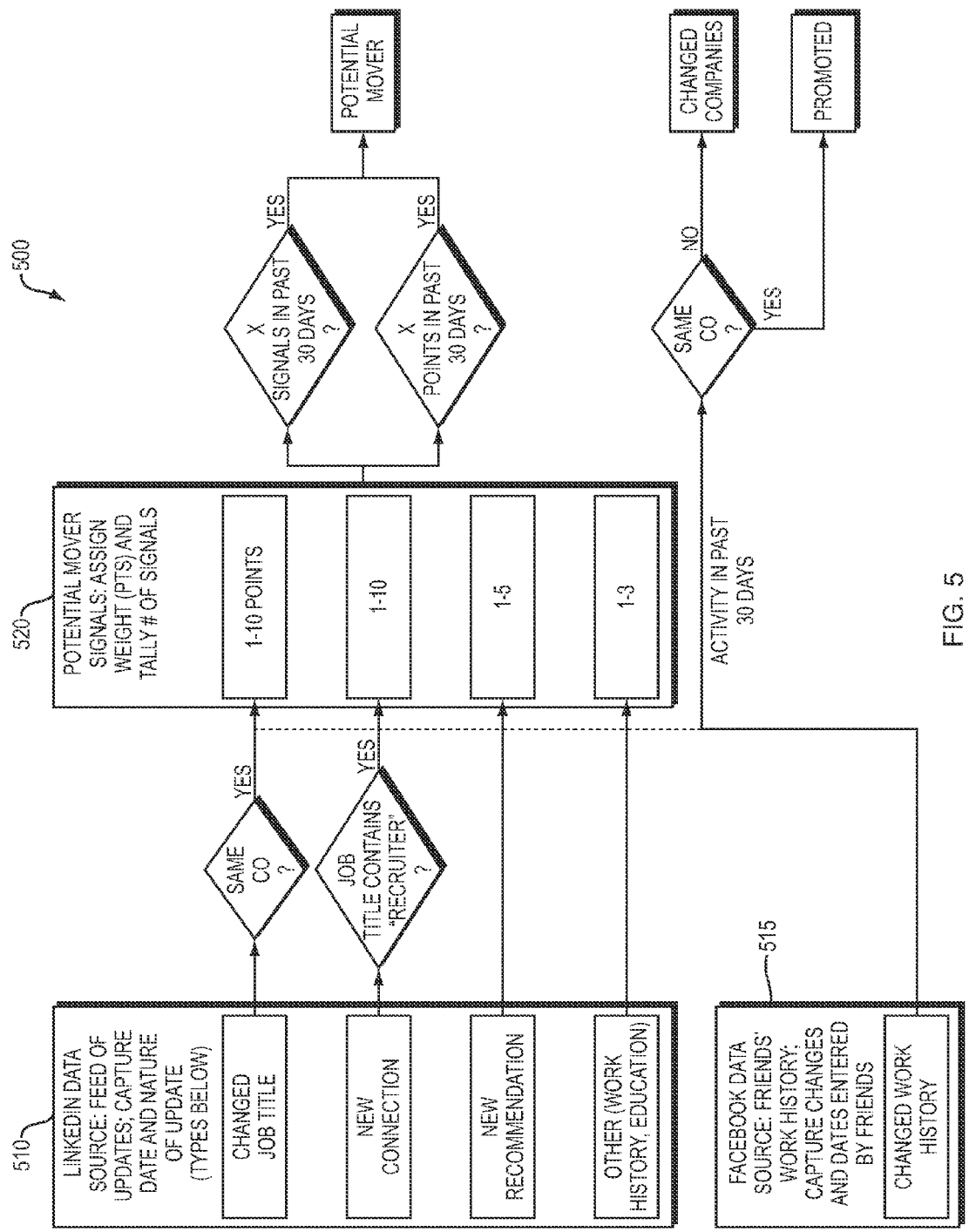
FIG. 5 is a flow diagram illustrating in greater detail a representative candidate scoring and analysis protocol.

Details of a representative scoring and analysis scheme 500 are depicted in FIG. 5. As illustrated, different data-collection routines 510, 515 may be employed for different social networks; that is, these routines are tailored to the types of data likely to be found in different social media, and accommodate restrictions imposed by the SMAs. A scoring routine 520 assigns numeric weights (in terms of points) to different relevant events or "signals" detected by the data-collection routines. The scoring routine 520 also evaluates the absolute number of signals, and the total number of points associated with all signals obtained, for a given candidate over a period of time (e.g., 30 days or 60 days). If the total points accumulated for a candidate within the predefined time period exceeds a threshold point level, or if the overall number of signals (regardless of weight) accumulated for a candidate exceeds a threshold signal level, or in some embodiments only if both conditions are satisfied, the candidate is considered (and his database record is updated to reflect) an active candidate for recruitment.

In the LinkedIn routine 510, the types of signals considered are changes in job title or other profile updates; new connections established; new recommendations; and postings that included certain telltale phrases (e.g., "looking for," "seeking," "searching," "available") suggestive of interest in new employment. Any profile update may receive a baseline number of points (e.g., four), as the activity is itself potentially indicative of receptivity to new opportunities. A profile update indicating a new job title receives a higher number of points, so long as the candidate has not changed employers; while a recent promotion may increase the candidate's marketability and entice her to consider leveraging her elevation into greater opportunity elsewhere, a change of employer within, for example, the previous three months is treated as a false-positive trigger (as discussed above), since it is unlikely that an individual will leave a new job immediately.

A recommendation obtained from someone else will generally receive more points than a recommendation given to someone else: while recommendations are often solicited in the context of active job searching, providing a recommendation for someone else indicates some level of engagement and possibly mutual "back-scratching" to facilitate a job search—particularly if this occurs repeatedly. For example, a new recommendation given to another may have a weight that is a fraction of (e.g., $\frac{1}{10}$ to $\frac{1}{2}$ of) the weight assigned to obtaining a new recommendation.

Establishing a new connection is typically considered a modest but nonzero indicator, so may have a signal weight of, for example, one or two points; but connecting to a recruiter is obviously a strong indicator of job-seeking behavior, and may have a weight that is a multiple of (e.g., 2 to 10 times) the weight assigned to establishing a new connection. As noted earlier in connection with FIG. 4, when a candidate adds a new connection, the system adds a record for the connected-to individual, and in addition, may scan that individual's profile for information suggesting she is a recruiter. Once this is established, connections to that individual by candidates being monitored are recognized as signals qualifying for the higher point level.

FACEBOOK is less business-oriented than LinkedIn and lacks update categories that are themselves indicative of job-seeking proclivity, so the procedure 515 used to access FACEBOOK APIs may examine the obviously relevant category of Changed Work History but otherwise search for relevant text phrases across categories. In addition, the procedure 515 identifies friends of a candidate and captures changes and dates entered by the candidate's friends, and in some embodiments, the procedure 515 scans their profiles for information relevant to their work histories. For example, if friends of the candidate recently resigned from the candidate's place of employment, the candidate may be considering a move as well. The procedure 515, like the procedure 510, identifies new connections ("friends") and changed job titles. Other potential FACEBOOK signals include observing the candidate connecting to a friend whose company's name suggests a recruiting firm (e.g., which contains the term "staffing" or "recruiters", etc.); text strings in status updates ("just got laid off", "anyone looking for a programmer", etc.); and identifying existing friends of the candidate who provide work information where it was previously blank, which suggests the friend may be seeking new employment. Also, periodic updates to FACEBOOK's profile template and information-sharing mechanisms may provide additional avenues for obtaining relevant information.

In a representative embodiment, the accumulation of a minimum number of points and/or signals in the recent past (e.g., a threshold number within the range of 10-20 points and/or 5-10 signals in the previous 60 days) identifies the candidate as a likely active candidate for recruitment. This time period can vary, however, depending on the nature of the recruitment opportunity and empirically determined behavior patterns of candidates for such positions. In some embodiments, all of the signals have time periods associated with them. Events more than, for example, one year old may be discarded as currently irrelevant. In addition, if a change in work experience occurred more than predetermined time period (e.g., 90 days) before the change was actually entered in the user's profile, it may be ignored; that is, if someone takes more than 90 days to update his work information, that update is probably not relevant to recruitment potential.

Analyzing traits associated with candidates who proved to be active recruitment candidates, as predicted ("true positives"), as well as those with high scores who were later dismissed by the system as active candidates may be used to refine event weights and, in some implementations, to add new potential categories of information for examination. For example, suppose a particular candidate appears in a set of results every six months, but is always dismissed as a false positive; perhaps he is an obsessive networker who is uninterested in actually changing positions, so his FACEBOOK and LinkedIn profiles may be analyzed and compared with those of others dismissed as false positives for similar reasons in order to discover predictors for this behavior; the routines 510,515 may then be modified to search for these predictors.

It should also be stressed that the operation of the routines 510, 515 is tailored both to comply with the requirements imposed by SMAs as well as to operate efficiently within constraints imposed by a site's APIs. For example, if an API limits the permissible daily number of profile requests, it may be useful to scan the profiles based on their most recent scores, so the most promising candidates are reviewed first.

FIG. 6 is a block diagram of a computer node/device 610 suitable for performing the functions described herein—e.g., a server implementing the system 100 shown in FIG. 1. The device 610 may be a general-purpose computer that includes a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

As shown in FIG. 6, the system 610 contains a system bus 630, which connects different elements of the device (e.g., processor, disk storage, memory, input/output ports, network ports, etc.) and enables the transfer of information between elements. Attached to the system bus 630 is an I/O device interface 640 for connecting various input and output devices (e.g., keyboard, mouse, displays, printers, speakers, etc.) to the device 610. A network interface 660 allows the device 610 to connect to various other devices attached to a network. Computer memory 670 provides volatile storage for computer software instructions 680 and data 690 used to implement the functions described above. Disk storage 675 provides non-volatile storage for computer software instructions 680 and data 690 used to implement the methods and systems disclosed herein; in particular, data storage 690 may include the prediction application database 140 (see FIG. 1). Central processor unit 650 is also attached to the system bus 630 and provides for the execution of computer instructions.

The term "disk storage" is herein used generally to connote any suitable nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus 630 through a removable or non-removable memory interface.

The processor 650 may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

More generally, the methods and techniques described herein (including the functional modules 310, 320, 330 illustrated in FIG. 2 and the routines 510, 520 shown in FIG. 5) may be implemented in hardware and/or software and realized as a fully functional system. Any suitable programming language may be used to implement without undue experimentation the functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages Although the present invention has been described with reference to specific details, it is not intended that such details should be regarded as limitations upon the scope of the invention, except as and to the extent that they are included in the accompanying claims.

What is claimed is:

1. A computer-implemented method for identifying active candidates for recruitment, the method comprising:
   repeatedly searching for information from at least one social media website regarding a prospective candidate over a predetermined time period, the information including (i) updates to the prospective candidate's end user profile during the predetermined time period, (ii) recommendations posted during the predetermined time period, (iii) social-media connections established during the predetermined time period, and (iv) text phrases indicative of recruitment potential introduced during the predetermined time period;
   analyzing the information for a pattern indicative of whether the prospective candidate is or is likely to become an active recruitment candidate; and
   computationally predicting, based on the obtained information, whether the prospective candidate is or is likely to become an active recruitment candidate.

2. The method of claim 1 wherein the information comprises signals and weights associated with the signals, and the pattern comprises at least one of (i) a minimum number of signals within the predetermined time period and (ii) a minimum aggregate signal weight within the predetermined time period.

3. The method of claim 1 wherein the information comprises false-positive indicators.

4. The method of claim 3 wherein the false-positive indicators comprise an indication that the prospective candidate has begun new employment within the past three months.

5. The method of claim 1 wherein the computational prediction step comprises computing, from the information, a quantitative score indicative of the likelihood that the prospective candidate is or will become an active recruitment candidate.

6. The method of claim 1 further comprising computationally initiating an action based on a positive prediction that the prospective candidate is or is likely to become an active recruitment candidate, the action comprising at least one of (i) alerting a user to the positive prediction, (ii) adding identifying information for the prospective candidate into an active candidate database, (iii) sending a message to the prospective candidate, or (iv) telephoning the prospective candidate.

7. A system for identifying active candidates for recruitment, comprising:
   (a) a database for storing information regarding prospective candidates; and
   (b) a processor for executing:
      (i) an information module for
         (A) repeatedly searching for information from at least one social media website regarding a prospective candidate over a predetermined time period, the information including (1) updates to the prospective candidate's end user profile during the predetermined time period, (2) recommendations posted during the predetermined time period, (3) social-media connections established during the predetermined time period, and (4) text phrases indicative of recruitment potential introduced during the predetermined time period, and
         (B) storing the information in the database; and
      (ii) a prediction module for scanning the database, analyzing the information for a pattern indicative of whether the prospective candidate is or is likely to become an active recruitment candidate, and predicting, based on the analyzed information, whether the prospective candidate is or is likely to become an active recruitment candidate.

8. The system of claim 7 wherein the information comprises signals and weights associated with the signals, and the pattern comprises at least one of (i) a minimum number of signals within the predetermined time period and (ii) a minimum aggregate signal weight within the predetermined time period.

9. The system of claim 7 wherein the information comprises false-positive indicators.

10. The system of claim 9 wherein the false-positive indicators comprise an indication that the prospective candidate has begun new employment within the past three months.

11. The system of claim 7 where the prediction module computes, from the information, a quantitative score indicative of the likelihood that the prospective candidate is or will become an active recruitment candidate.

12. The system of claim 7 further comprising an action module for generating reports of predictions made by the prediction module.

* * * * *